US012704881B2

(12) United States Patent
Seo et al.

(10) Patent No.: US 12,704,881 B2
(45) Date of Patent: Aug. 11, 2026

(54) WINDOW OF A FOLDABLE ELECTRONIC APPARATUS AND METHOD FOR MANUFACTURING THE SAME

(71) Applicant: Samsung Display Co., LTD., Yongin-si (KR)

(72) Inventors: Jeongweon Seo, Yongin-si (KR); Seung-Won Kuk, Yongin-si (KR); Joon-Hyung Kim, Yongin-si (KR); Taewoo Park, Yongin-si (KR); Gwangtaek Lee, Yongin-si (KR); Jeongho Hwang, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 19/092,735

(22) Filed: Mar. 27, 2025

(65) Prior Publication Data

US 2026/0010204 A1 Jan. 8, 2026

(30) Foreign Application Priority Data

Jul. 4, 2024 (KR) ........................ 10-2024-0087934

(51) Int. Cl.
*G06F 1/16* (2006.01)
*C03C 17/00* (2006.01)
*C03C 17/32* (2006.01)

(52) U.S. Cl.
CPC .......... *G06F 1/1652* (2013.01); *C03C 17/001* (2013.01); *C03C 17/32* (2013.01);
(Continued)

(58) Field of Classification Search
CPC .... G06F 1/1652; G06F 1/1616; G06F 1/1658; C03C 17/001; C03C 17/32;
(Continued)

(56) References Cited

U.S. PATENT DOCUMENTS 7,264,526 B2 9/2007 Kim et al.
10,020,462 B1 * 7/2018 Ai ........................ H10K 59/871
(Continued)

FOREIGN PATENT DOCUMENTS

CN 112185256 A 1/2021
CN 219267223 U * 6/2023 ............. G09F 9/301
(Continued)

*Primary Examiner* — Mark Edwards
(74) *Attorney, Agent, or Firm* — CANTOR COLBURN LLP

(57) ABSTRACT

A window includes a glass substrate, a first resin covering at least one among side surfaces of the glass substrate, and a second resin covering an upper surface of the glass substrate. The glass substrate includes a first flat portion having a first thickness, a second flat portion spaced apart from the first flat portion in a first direction and having the first thickness, and a recessed portion disposed between the first flat portion and the second flat portion, and having a second thickness smaller than the first thickness. A width of the recessed portion is smaller than a width of each of the first flat portion and the second flat portion, and the width of each of the recessed portion, the first flat portion, and the second flat portion is defined in a second direction crossing the first direction.

20 Claims, 16 Drawing Sheets

(52) U.S. Cl.
CPC .......... *G06F 1/1616* (2013.01); *G06F 1/1658* (2013.01); *C03C 2218/32* (2013.01)

(58) Field of Classification Search
CPC ............ C03C 2218/32; H04M 1/0214; H04M 1/0216; H04M 1/0268
USPC .......................................................... 345/173
See application file for complete search history.

(56) References Cited

U.S. PATENT DOCUMENTS

| | | | | |
|---|---|---|---|---|
| 12,045,095 | B2 | 7/2024 | Hwang et al. | |
| 2006/0121815 | A1* | 6/2006 | Kim | H01J 11/36 445/24 |
| 2007/0211418 | A1* | 9/2007 | Iwamoto | G06F 1/1637 361/679.55 |
| 2023/0384835 | A1* | 11/2023 | Kang | H04M 1/0268 |

FOREIGN PATENT DOCUMENTS

| | | | |
|---|---|---|---|
| KR | 100450832 | B1 | 10/2004 |
| KR | 1020230063998 | A | 5/2023 |
| KR | 1020230137360 | A | 10/2023 |
| KR | 1020230164806 | A | 12/2023 |

* cited by examiner

FIG. 3C

GP
GP-SS1
RS2
GP-SS4
GP-SS2
GP-SS1
GP-SS2
GP-SS3
GP-SS4
GP-SS
NFA2
FLP2
FA
RP
NFA1
FLP1
GP-SS3
DR2
DR1

FIG. 10C

FIL2
FIL1
FIL3
NFA2
FA
NFA1
IP
RS
GP
DR2
DR1
DR3

WINDOW OF A FOLDABLE ELECTRONIC APPARATUS AND METHOD FOR MANUFACTURING THE SAME

This application claims priority to Korean Patent Application No. 10-2024-0087934, filed on Jul. 4, 2024, and all the benefits accruing therefrom under 35 U.S.C. § 119, the content of which in its entirety is herein incorporated by reference.

BACKGROUND

1. Field

The disclosure herein relates to a window and a method for manufacturing a window, and more particularly, to a method for manufacturing a window of a foldable electronic apparatus.

2. Description of the Related Art

Display devices include a display region which is activated in response to an electrical signal. Display devices may sense an input applied from the outside through a display region, and at the same time, may provide information to a user by displaying various images. Recently, as display devices with various shapes have been developed, research is being actively conducted particularly on foldable display devices, and a method for efficiently manufacturing ultra-thin glass ("UTG") to achieve both foldable properties and impact resistance is increasingly demanded.

SUMMARY

The disclosure provides a window with improved impact resistance and visibility.

An embodiment of the inventive concept provides a window including a glass substrate, a first resin which covers at least one among side surfaces of the glass substrate, and a second resin which covers an upper surface of the glass substrate, wherein the glass substrate includes a first flat portion having a first thickness, a second flat portion spaced apart from the first flat portion in a first direction and having the first thickness, and a recessed portion disposed between the first flat portion and the second flat portion and having a second thickness smaller than the first thickness, a width of the recessed portion is smaller than a width of each of the first flat portion and the second flat portion, and the width of each of the recessed portion, the first flat portion, and the second flat portion is defined in a second direction crossing the first direction.

In an embodiment, a folding axis extending along the second direction and overlapping the recessed portion may be defined, and the recessed portion may be folded along the folding axis.

In an embodiment, a side surface of the recessed portion may be curved.

In an embodiment, the first resin may have a width which is constant in the second direction.

In an embodiment, a surface, of the first resin, which contacts the glass substrate may be flat.

In an embodiment, the first resin may cover a side surface of the recessed portion and expose side surfaces of the first and second flat portions.

In an embodiment, the first resin may include a surface aligned with the side surfaces of the first and second flat portions.

In an embodiment, the second resin may include a lower surface facing the glass substrate and an upper surface opposed to the lower surface, and the upper surface of the second resin may be flat.

In an embodiment of the inventive concept, a window module includes a glass substrate including an upper surface including an upper surface of a recessed portion, a lower surface opposed to the upper surface, and a plurality of side surfaces connecting the upper surface and the lower surface, a first film including a surface facing the plurality of side surfaces of the glass substrate, a second film spaced apart from the upper surface so that a predetermined space is defined between the second film and the upper surface and including a first surface in which a groove portion facing the recessed portion of the upper surface is defined, a third film including a second surface facing the lower surface of the glass substrate, and a resin filled into the space, wherein the resin contacts the recessed portion of the upper surface, and the first film is disposed between the first surface and the second surface.

In an embodiment, the first surface may further include stepped portions spaced apart from each other with the groove portion between stepped portions immediately next to each other among the plurality of stepped portions.

In an embodiment, a virtual plane extending from an upper surface of the first film to overlap the glass substrate may be defined, and a maximum spaced distance between the stepped portions and the virtual plane and a maximum spaced distance between the groove portion and the virtual plane may be different.

In an embodiment, the resin may contact the groove portion of the first surface.

In an embodiment, the resin may have a flat upper surface which is not in contact with the first surface.

In an embodiment, the first film may be spaced apart from the plurality of side surfaces of the glass substrate and may contact the resin.

In an embodiment, the first film may be in direct contact with the plurality of side surfaces of the glass substrate.

In an embodiment, a thickness of the first film may be greater than a maximum thickness of the glass substrate.

In an embodiment of the inventive concept, a method for manufacturing a window includes providing a glass substrate which includes an upper surface including an upper surface of a recessed portion, a lower surface opposed to the upper surface, and a plurality of side surfaces connecting the upper surface and the lower surface, disposing a first film which includes a surface facing the plurality of side surfaces of the glass substrate, disposing a second film which is spaced apart from the upper surface so that a predetermined space is defined between the second film and the upper surface and includes a first surface in which a groove portion facing the recessed portion of the upper surface is defined, and a third film which includes a second surface facing the lower surface of the glass substrate such that the first film is disposed between the first surface and the second surface, filling, with a resin, a space defined between the glass substrate and the first to third films, and curing the resin, wherein the resin is filled by a capillary phenomenon.

In an embodiment, in the filling with the resin, the resin may be filled while being in contact with the groove portion.

In an embodiment, in the curing the resin, the resin may be spaced apart from the groove portion.

In an embodiment, in the disposing the films, the first film may be spaced apart from a side surface of the plurality of side surfaces of the glass substrate to define a predetermined space.

BRIEF DESCRIPTION OF THE DRAWINGS

The accompanying drawings are included to provide a further understanding of the inventive concept, and are incorporated in and constitute a part of this specification. The drawings illustrate embodiments of the inventive concept and, together with the description, serve to explain principles of the inventive concept. In the drawings:

FIG. 3B and FIG. 3C are plan views of an embodiment of a window according to the inventive concept;

FIGS. 10A to 10C are respectively a cross-sectional view and perspective views illustrating an embodiment of a part of operations of a method for manufacturing a window according to the inventive concept.

DETAILED DESCRIPTION

Figure 1A:
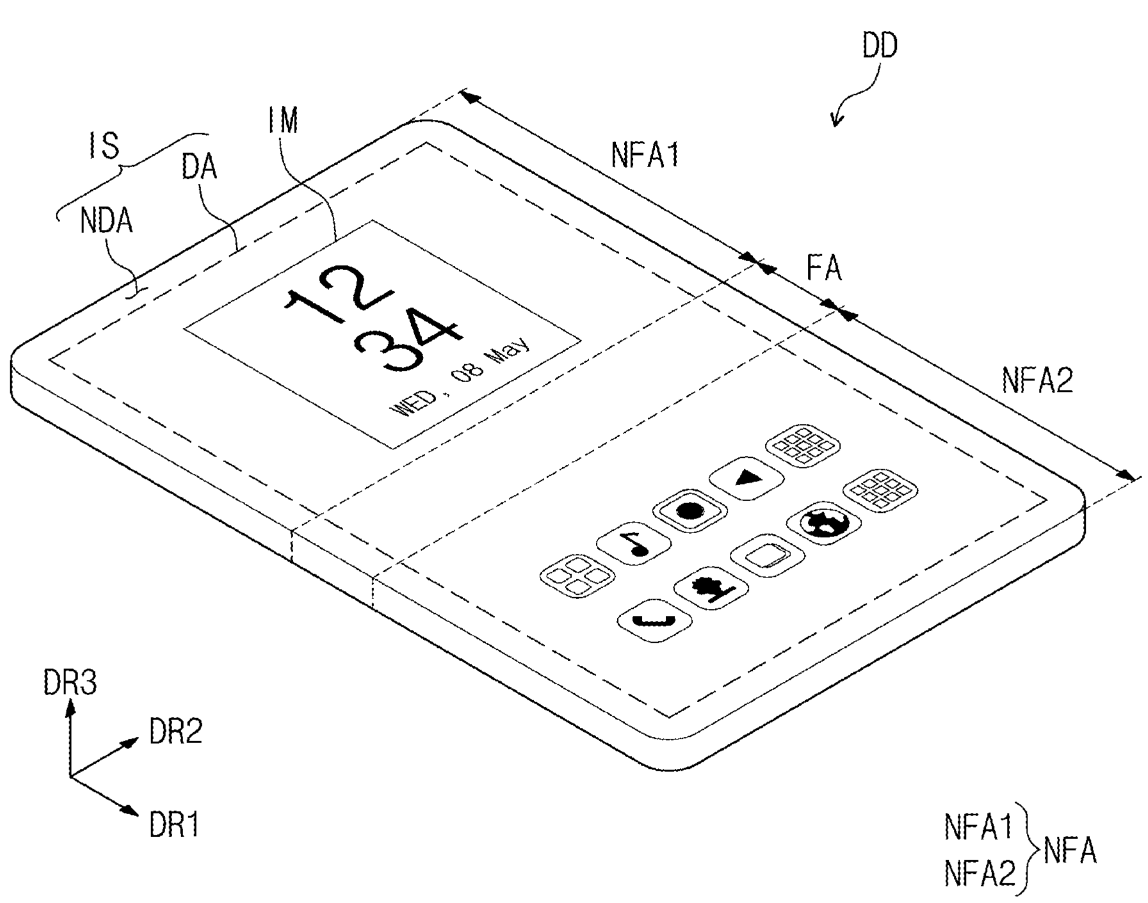
FIG. 1A is a perspective view of an embodiment of a display device according to the inventive concept.

In this specification, it will be understood that when an element (or a region, a layer, a portion, or the like) is referred to as being "on", "connected to" or "coupled to" another element, it may be directly disposed on/connected to/coupled to the other element or layer or intervening elements may be disposed therebetween.

Like numerals or symbols refer to like elements throughout. Also, in the drawings, the thicknesses, ratios, and dimensions of the elements are exaggerated for effective description of the technical contents. The term "and/or" includes all of one or more combinations which may be defined by related elements.

Although the terms first, second, etc. may be used to describe various elements, these elements should not be limited by these terms. These terms are only used to distinguish one element from another element. For example, a first element may be referred to as a second element, and similarly, a second element may also be referred to as a first element without departing from the scope of the disclosure. The singular forms include the plural forms as well, unless the context clearly indicates otherwise.

Also, terms of "below", "on lower side", "above", "on upper side", or the like may be used to describe the relationships of the elements illustrated in the drawings. These terms have relative concepts and are described on the basis of the directions indicated in the drawings.

It will be understood that the term "includes" or "comprises", when used in this specification, specifies the presence of stated features, integers, steps, operations, elements, components, or a combination thereof, but does not preclude the presence or addition of one or more other features, integers, steps, operations, elements, components, or combinations thereof.

Unless otherwise defined, all terms (including technical and scientific terms) used herein have the same meaning as commonly understood by one of ordinary skills in the art to which the disclosure belongs. Also, terms, such as those defined in commonly used dictionaries, should be interpreted as having a meaning that is consistent with their meaning in the context of the relevant art and should not be interpreted in an idealized or overly formal sense unless expressly so defined herein.

Hereinafter, embodiments of the inventive concept will be described with reference to the accompanying drawings.

Figure 1B:
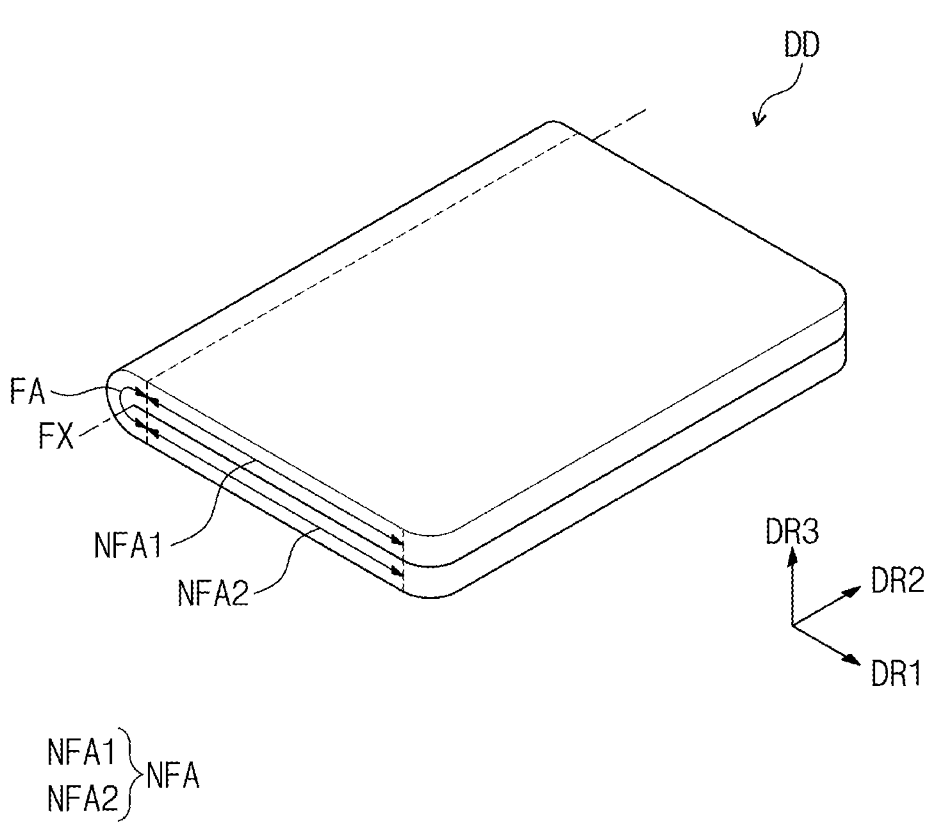
FIG. 1B is a perspective view of an embodiment of a display device according to the inventive concept.

FIGS. 1A and 1B are perspective views of an embodiment of a display device DD according to the inventive concept. FIG. 1A illustrates an unfolded state, and FIG. 1B illustrates a folded state.

Referring to FIGS. 1A and 1B, the display device DD in an embodiment of the inventive concept may include a display surface IS defined by a first direction DR1 and a second direction DR2 crossing the first direction DR1. The display device DD may provide an image IM to a user through the display surface IS.

Hereinafter, a direction substantially perpendicularly crossing a plane defined by the first direction DR1 and the second direction DR2 is defined as a third direction DR3. The third direction DR3 is a reference direction in which a front surface and a rear surface of each member are defined. In this specification, the wording "in a plan view" may be defined as a state viewed in the third direction DR3. Hereinafter, the first to third directions DR1, DR2, and DR3 may be the directions respectively indicated by first to third direction axes, and may thus be denoted as the same reference numerals or symbols.

FIGS. 1A and 1B illustrate a foldable display device in an embodiment of the flexible display device DD. However, according to the inventive concept, the display device may be a bendable display device or a rollable display device that is rolled up, and is not particularly limited. The flexible display device DD according to the inventive concept may be used in a small-sized and medium-sized electronic apparatus such as a mobile phone, a tablet personal computer ("PC"), a car navigation system, a game console, or a smart watch as well as in a large-sized electronic apparatus such as a television or a monitor. Hereinafter, the display device DD will be described as a foldable display device.

As illustrated in FIG. 1A, the display surface IS of the display device DD may include a plurality of regions. The display device DD may include a display region DA in which the image IM is displayed and a non-display region NDA next (adjacent) to the display region DA. The non-display region NDA is a region in which the image is not displayed. FIG. 1A illustrates a clock widget as one embodiment of the image IM. In an embodiment, the display region DA may have a quadrangular shape. The non-display region NDA may surround the display region DA, for example. However, the inventive concept is not limited thereto, and a shape of the display region DA and a shape of the non-display region NDA may be designed relatively. In an embodiment, the non-display region NDA may be omitted.

The display device DD may include a folding region FA and a plurality of non-folding regions NFA. The non-folding regions NFA may include a first non-folding region NFA1 and a second non-folding region NFA2. In the second direction DR2, the folding region FA may be disposed between the first non-folding region NFA1 and the second non-folding region NFA2.

As illustrated in FIG. 1B, the folding region FA may be folded with respect to a folding axis FX that is parallel to the second direction DR2. The display device DD may be in-folded so that the display surface IS is not exposed to the outside, while the first non-folding region NFA1 and the second non-folding region NFA2 are facing each other.

When the display device DD includes two non-folding regions NFA, the non-folding regions NFA may have the same area, but the inventive concept is not limited thereto. The areas of the non-folding regions NFA may be greater than an area of the folding region FA. In an embodiment, the area of the folding region FA may not be fixed, and may be determined depending on a radius of curvature.

Figure 2:
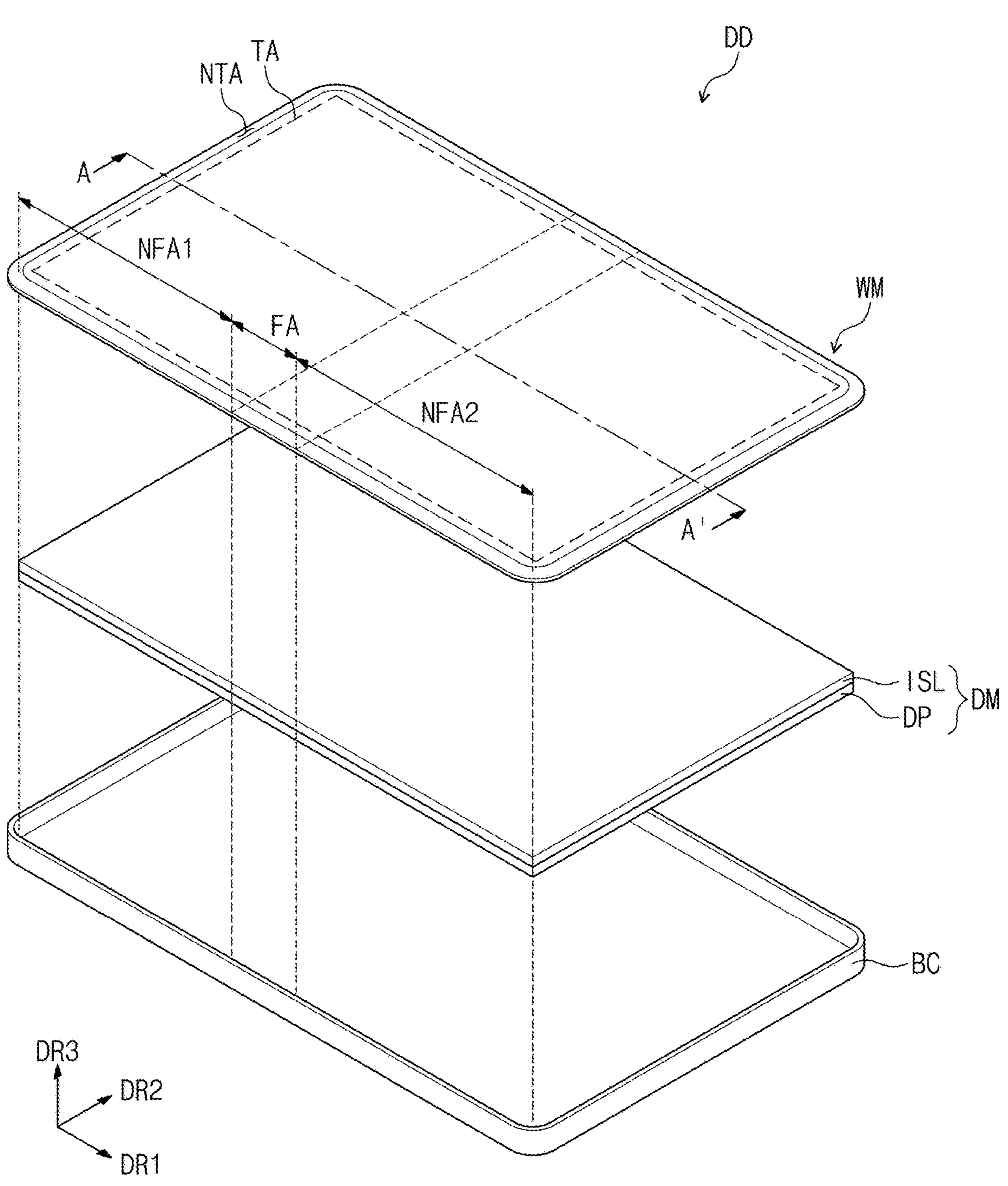
FIG. 2 is an exploded perspective view of an embodiment of a display device according to the inventive concept.

FIG. 2 is an exploded perspective view of an embodiment of a display device DD according to the inventive concept.

Referring to FIG. 2, the display device DD may include a window WM, a display module DM, and an accommodation member BC.

The window WM may be disposed on the display module DM, and may transmit an image, which is provided from the display module DM, to the outside. The window WM may include a transmissive region TA and a non-transmissive region NTA. The transmissive region TA may overlap a display region DA, and may have a shape corresponding to the display region DA. An image IM displayed in the display region DA of the display device DD may be viewed from the outside through the transmissive region TA of the window WM.

The window WM may include a glass substrate GP (refer to FIG. 3). The glass substrate GP (refer to FIG. 3) that constitutes the window WM may be an ultra-thin glass substrate having a thickness of about 20 micrometers (μm) to about 100 μm. Since the window WM has a relatively small thickness, the window WM may be flexible to change in shape according to external force. Accordingly, the window WM may stably protect a display panel in the flexible display device DD that is foldable or bendable.

The non-transmissive region NTA may overlap a non-display region NDA, and have a shape corresponding to the non-display region NDA. The non-transmissive region NTA may be a region having a relatively lower light transmittance than the transmissive region TA. However, the technical spirit of the inventive concept is not limited thereto, and the non-transmissive region NTA may be omitted.

The display module DM may be disposed between the window WM and the accommodation member BC. The display module DM may include a display panel DP and an input sensing layer ISL disposed on the display panel DP. The display panel DP may generate an image and deliver the generated image to the window WM. In an embodiment of the inventive concept, the display panel DP may be a light-emitting display panel, but the type thereof is not particularly limited. In an embodiment, the display panel DP may be an organic light-emitting display panel or a quantum dot light-emitting display panel, for example. A light-emitting layer of the organic light-emitting display panel may include an organic light-emitting material. A light-emitting layer of the quantum dot light-emitting display panel may include quantum dots, quantum rods, or the like. Hereinafter, the display panel DP in an embodiment will be described as the organic light-emitting display panel.

The input sensing layer ISL may be disposed between the window WM and the display panel DP. As illustrated in FIG. 2, the input sensing layer ISL may cover an entirety of the transmissive region TA. However, in an embodiment of the inventive concept, the input sensing layer ISL may overlap only a portion of the transmissive region TA, or may overlap only the non-transmissive region NTA. The input sensing layer ISL may sense an input applied from the outside. The input applied from the outside may be provided in various forms. In an embodiment, an external input may include various types of external inputs such as a part of the user body, a stylus pen, light, heat, or pressure, for example. In addition, not only a touch by a user's body part such as a hand, but also a spatial touch (e.g., hovering) of approaching or becoming next (adjacent) to the input sensing layer may be one type of the input.

The input sensing layer ISL may sense an external input and acquire coordinate information about the external input. The input sensing layer ISL in an embodiment of the inventive concept may sense the external input by sensing a change in capacitance caused by an external object. That is, the input sensing layer ISL in an embodiment may be a capacitive input sensor.

The accommodation member BC may accommodate the display module DM. Although not illustrated, the accommodation member BC may include a hinge. The hinge may be formed in a portion, overlapping the folding region FA, of the accommodation member BC. In an embodiment, the accommodation member BC may be omitted.

Figure 3A:
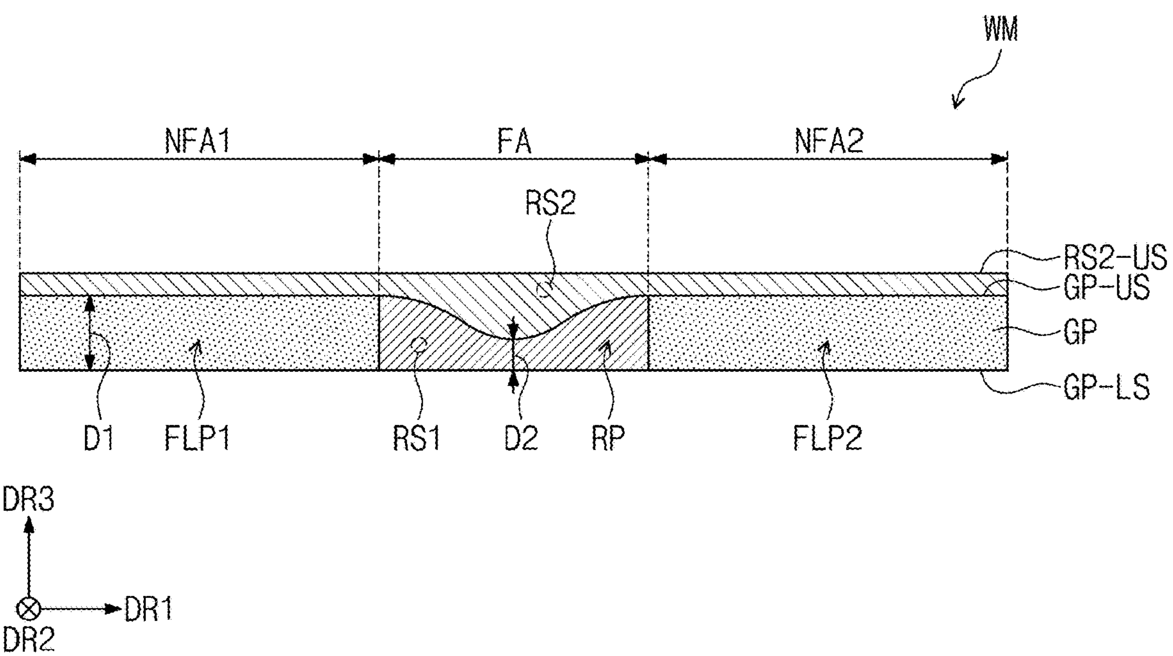
FIG. 3A is a cross-sectional view of an embodiment of a window according to the inventive concept.
Figure 3B:
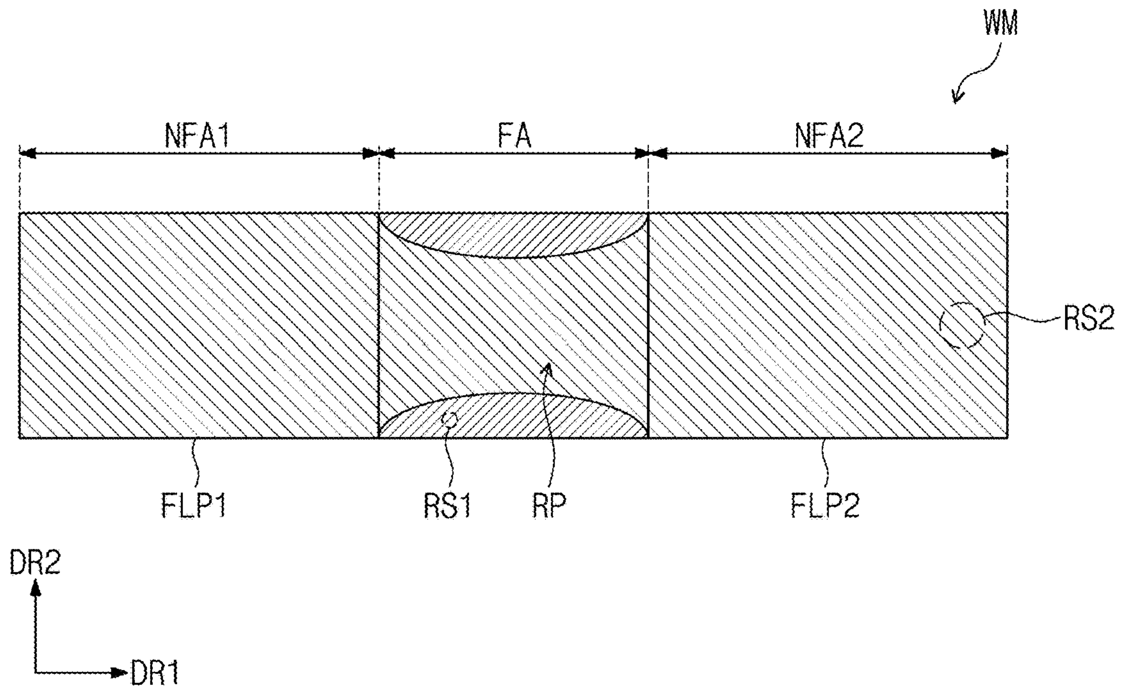
Figure 3C:
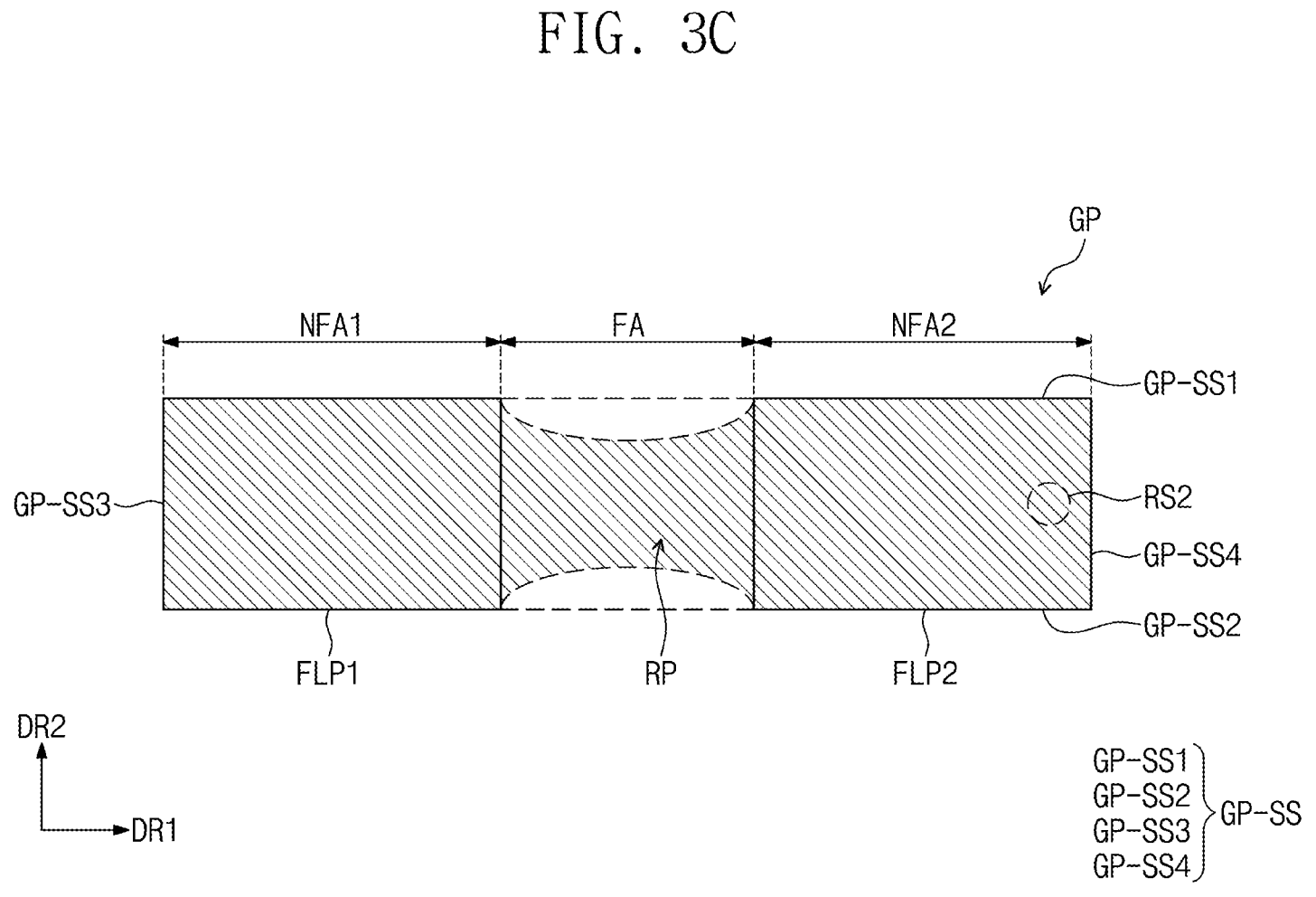

FIG. 3A is a cross-sectional view of an embodiment of a window WM according to the inventive concept. FIGS. 3B and 3C are plan views of a window. For convenience of explanation, some components are omitted in FIG. 3C. Hereinafter, in description to be made with reference to FIGS. 3A to 3C, components that are the same as/similar to the components described with reference to FIGS. 1A to 2 will be denoted as the same/similar reference numerals or symbols, and a duplicate explanation thereof will be omitted.

Referring to FIGS. 3A to 3C, the window WM may include a glass substrate GP, a first resin RS1, and a second resin RS2.

On a plane defined by a first direction DR1 and a second direction DR2, the glass substrate GP may include an upper surface having a first non-folding region NFA1, a second non-folding region NFA2, and a folding region FA between the first and second non-folding regions NFA1 and NFA2. The first non-folding region NFA1, the second non-folding region NFA2, and the folding region FA which are defined in the glass substrate GP may respectively correspond to the first non-folding region NFA1 (refer to FIG. 1), the second non-folding region NFA2 (refer to FIG. 1), and the folding region FA (refer to FIG. 1) which are defined in the display device DD (refer to FIG. 1).

Referring to FIGS. 3A and 3C, the glass substrate GP may include an upper surface GP-US defined by the first direction DR1 and the second direction DR2, a lower surface GP-LS opposed to the upper surface GP-US, and a plurality of side surfaces GP-SS connecting the upper surface GP-US and the lower surface GP-LS. The glass substrate GP may include a first flat portion FLP1 overlapping the first non-folding region NFA1, a second flat portion FLP2 overlapping the second non-folding region NFA2, and a recessed portion RP overlapping the folding region FA. The first flat portion FLP1, the recessed portion RP, and the second flat portion FLP2 may be arranged along the first direction DR1. That is, the first flat portion FLP1 and the second flat portion FLP2 may be spaced apart from each other in the first direction DR1 with the recessed portion RP therebetween. The glass substrate GP may extend along the second direction DR2 and may be folded along a folding axis FX which overlaps the recessed portion RP.

An upper surface of each of the first flat portion FLP1 and the second flat portion FLP2 may be flat. The upper surface of each of the first flat portion FLP1 and the second flat portion FLP2 may be parallel to a plane defined by the first direction DR1 and the second direction DR2.

An upper surface of the recessed portion RP may be depressed from the upper surface of each of the first flat portion FLP1 and the second flat portion FLP2. The upper surface of the recessed portion RP may include a flat surface or a curved surface. The curved surface may be a surface recessed with respect to an upper surface of the window WM. FIG. 3 illustrates an embodiment in which the upper surface of the recessed portion RP is a curved surface.

A lower surface of the recessed portion RP may be aligned with a lower surface of each of the first flat portion FLP1 and the second flat portion FLP2. That is, the lower surface of the glass substrate GP may be a flat surface that is parallel to a plane defined by the first direction DR1 and the second direction DR2.

Accordingly, the recessed portion RP may have a thickness which is different from that of the first flat portion FLP1 and that of the second flat portion FLP2. In an embodiment, the first flat portion FLP1 and the second flat portion FLP2 may have a first thickness D1 and the recessed portion RP may have a second thickness D2 smaller than the first thickness D1, for example.

Here, a ratio of the second thickness D2 to the first thickness D1 may be about 0.5 to about 0.6. However, the inventive concept is not limited thereto.

Referring to FIGS. 3B and 3C, a width of the recessed portion RP defined in the second direction DR2 may be different from that of the first flat portion FLP1 and that of the second flat portion FLP2. The width of the recessed portion RP may be smaller than a width of each of the first flat portion FLP1 and the second flat portion FLP2. That is, a side surface of the recessed portion on the side surface GP-SS of the glass substrate GP defined by the second direction DR2 and a third direction DR3 may be depressed more than side surfaces of the first flat portion FLP1 and the second flat portion FLP2. The side surface of the recessed portion RP may include a flat surface or a curved surface. The side surface of the recessed portion RP may have various shapes as long as the side surface of the recessed portion RP is depressed more than the side surfaces of the first flat portion FLP1 and the second flat portion FLP2, and the inventive concept is not limited to a particular embodiment.

In this embodiment, it is illustrated that the first flat portion FLP1 and the second flat portion FLP2 have the same thickness, but this is illustrated. The first flat portion FLP1 and the second flat portion FLP2 may have different thicknesses. In an embodiment, when the first flat portion FLP1 has the first thickness D1 and the second flat portion FLP2 has the second thickness D2 that is different from the first thickness D1, the recessed portion RP may have a third thickness D3 which is smaller than the first thickness D1 and the second thickness D2, for example. In the glass substrate GP in the illustrative embodiment, as long as the upper surface of the recessed portion RP has a depressed shape relative to the upper surfaces of the first flat portion FLP1 and the second flat portion FLP2, the thicknesses of the first flat portion FLP1 and the second flat portion FLP2 may be variously changed. The inventive concept is not limited to a particular embodiment.

The first resin RS1 may cover at least one of the side surfaces GP-SS of the glass substrate GP. In this embodiment, the first resin RS1 may be provided in plural to cover a portion of a first side surface GP-SS1 and a portion of a second side surface GP-SS2. The portions covered by the first resin RS1 may be substantially the side surfaces of the recessed portion RP. That is, in this embodiment, the first resin RS1 may cover the side surfaces of the recessed portion RP of the glass substrate GP, and may expose the side surfaces of the first and second flat portions FLP1 and FLP2. The first resin RS1 may be aligned with the side surfaces of the first and second flat portions FLP1 and FLP2. In an embodiment, the glass substrate GP may further include a third side surface GP-SS3 and a fourth side surface GP-SS4 which are opposite to each other in the first direction DR1.

Referring to FIGS. 3A and 3B, the second resin RS2 may cover the upper surface GP-US of the glass substrate GP. The second resin RS2 may cover an entirety of the upper surface GP-US of the glass substrate GP. The second resin RS2 may cover all of the upper surfaces of the first and second flat portions FLP1 and FLP2 and the upper surface of the recessed portion RP. An upper surface RS2-US of the second resin RS2 may be flat. That is, the upper surface RS2-US of the second resin RS2 may not include curved portions. The upper surface RS2-US of the second resin RS2 may be provided to be flat all over the first non-folding region NFA1, the second non-folding region NFA2, and the folding region FA, and therefore display properties, an external light reflectance, or the like of the upper surface of the window WM may be exhibited uniformly throughout the upper surface. Thus, the product visibility of the display panel DP may be improved.

Referring to FIGS. 3B and 3C, the first flat portion FLP1 may be a portion corresponding to the first non-folding region NFA1, the second flat portion FLP2 may be a portion corresponding to the second non-folding region NFA2, and the recessed portion RP may be a portion corresponding to the folding region FA. Here, the width of the recessed portion RP in the second direction DR2 may be smaller than the width of each of the first flat portion FLP1 and the second flat portion FLP2. The side surface of the recessed portion RP may be curved. However, the inventive concept is not limited thereto, and the side surface of the recessed portion RP may have various shapes. In an embodiment, the side surface of the recessed portion RP may be flat, for example.

Referring to FIGS. 3A and 3B, the first resin may include a surface aligned with the side surfaces of the first and second flat portions.

Referring to FIGS. 3A and 3B, the first resin RS1 may be in direct contact with the side surface of the recessed portion RP. Accordingly, the surface, of the first resin RS1, which contacts the glass substrate GP may be curved. However, the inventive concept is not limited thereto, and the surface, of the first resin RS1, which contacts the glass substrate GP may have various shapes so as to correspond to a shape of the side surface of the glass substrate GP. In an embodiment, the surface, of the first resin RS1, which contacts the glass substrate GP may be flat, for example. The first resin RS1 may have a width which is constant in the second direction DR2.

Figure 4:
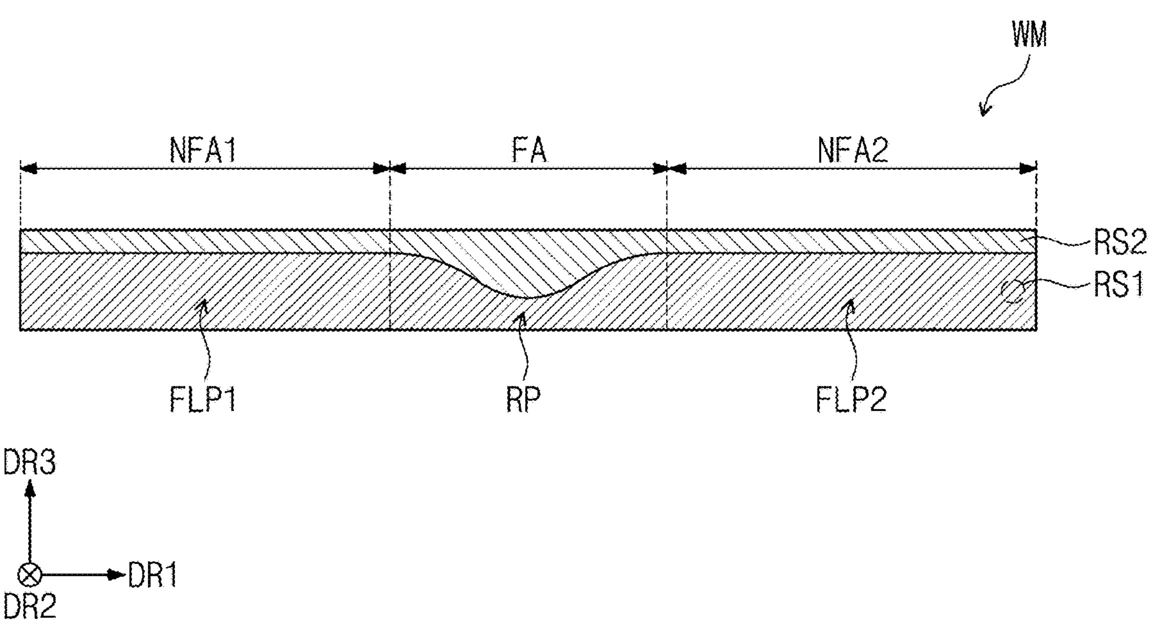
FIG. 4 is a cross-sectional view of an embodiment of a window according to the inventive concept.

FIG. 4 is a cross-sectional view of an embodiment of a window WM according to the inventive concept. Hereinafter, in description to be made with reference to FIG. 4, components that are the same as/similar to the components described with reference to FIGS. 1A to 3C will be denoted as the same/similar reference numerals or symbols, and a duplicate explanation thereof will be omitted.

Referring to FIG. 4, the window WM may include an entirely flat side surface. In this embodiment, unlike FIG. 3C, the width of the recessed portion RP in the second direction DR2 may be the same as the width of each of the first and second flat portions FLP1 and FLP2. The first resin RS1 may cover all of the side surface of the recessed portion RP and the side surfaces of the first and second flat portions FLP1 and FLP2. Accordingly, the width, in the second direction DR2, of the first resin RS1 which covers the recessed portion RP, the first flat portion FLP1 and the second flat portion FLP2 may be uniform.

Figure 5:
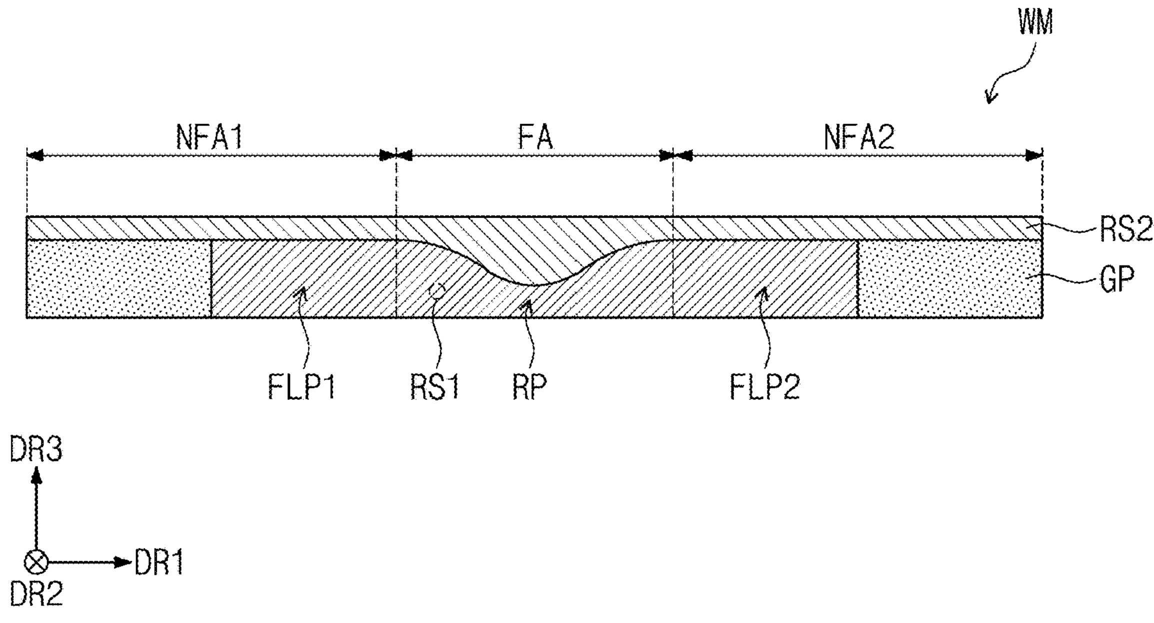
FIG. 5 is a cross-sectional view of an embodiment of a window according to the inventive concept.

FIG. 5 is a cross-sectional view of an embodiment of a window WM according to the inventive concept. Hereinafter, in description to be made with reference to FIG. 5, components that are the same as/similar to the components described with reference to FIGS. 1A to 3C will be denoted as the same/similar reference numerals or symbols, and a duplicate explanation thereof will be omitted.

Referring to FIG. 5, the first resin RS1 may cover the side surface of the recessed portion RP and at least a portion of the side surfaces of the first and second flat portions FLP1 and FLP2. That is, at least a portion of the side surfaces of the first and second flat portions FLP1 and FLP2 may be exposed by the first resin RS1. The first resin RS1 may protrude from the side surfaces of the first and second flat portions FLP1 and FLP2.

Figure 6:
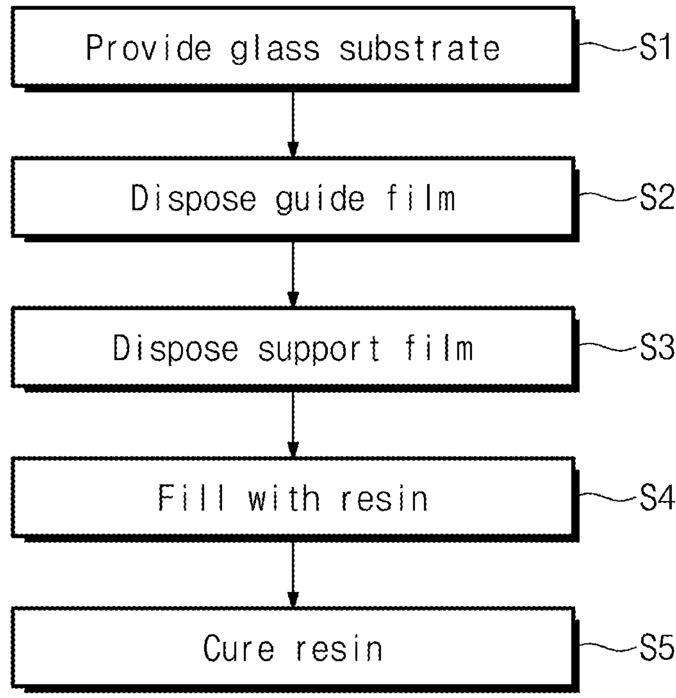
FIG. 6 is a block diagram illustrating an embodiment of a window manufacturing flow according to the inventive concept.

FIG. 6 is a block diagram illustrating an embodiment of a window WM manufacturing flow according to the inventive concept. FIGS. 7A to 11B are cross-sectional views and perspective views illustrating an embodiment of operations of a method for manufacturing a window WM according to the inventive concept. Hereinafter, in description to be made with reference to FIGS. 6 to 11B, components that are the same as/similar to the components described with reference to FIGS. 1A to 5 will be denoted as the same/similar reference numerals or symbols, and a duplicate explanation thereof will be omitted.

Figure 7A:
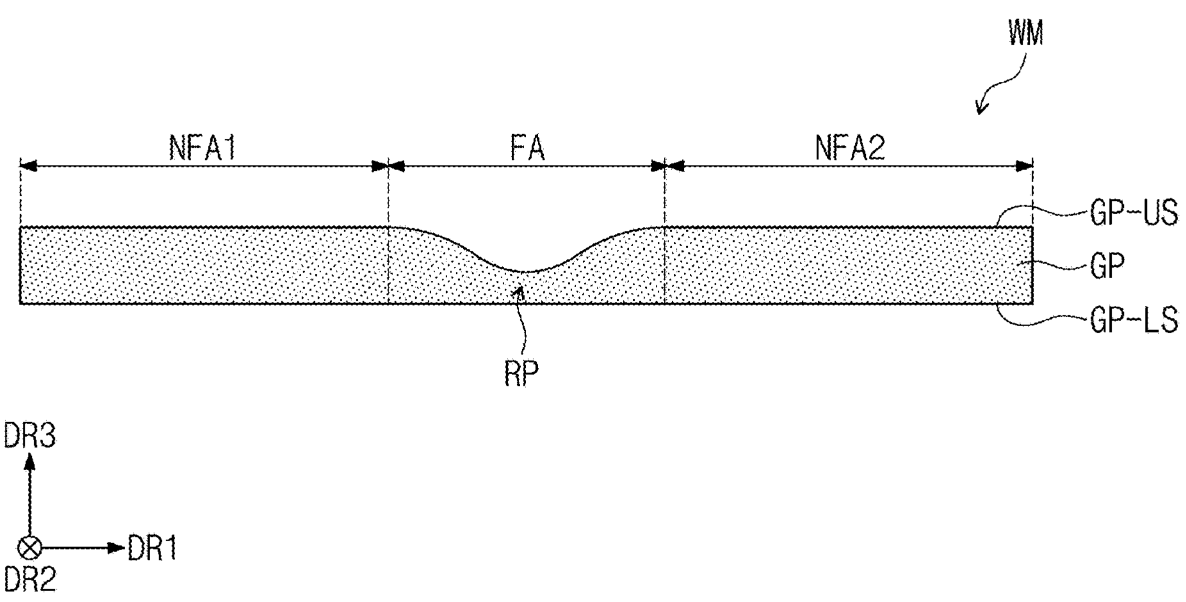
FIGS. 7A and 7B are respectively a cross-sectional view and a perspective view illustrating an embodiment of a part of operations of a method for manufacturing a window according to the inventive concept.
Figure 7B:
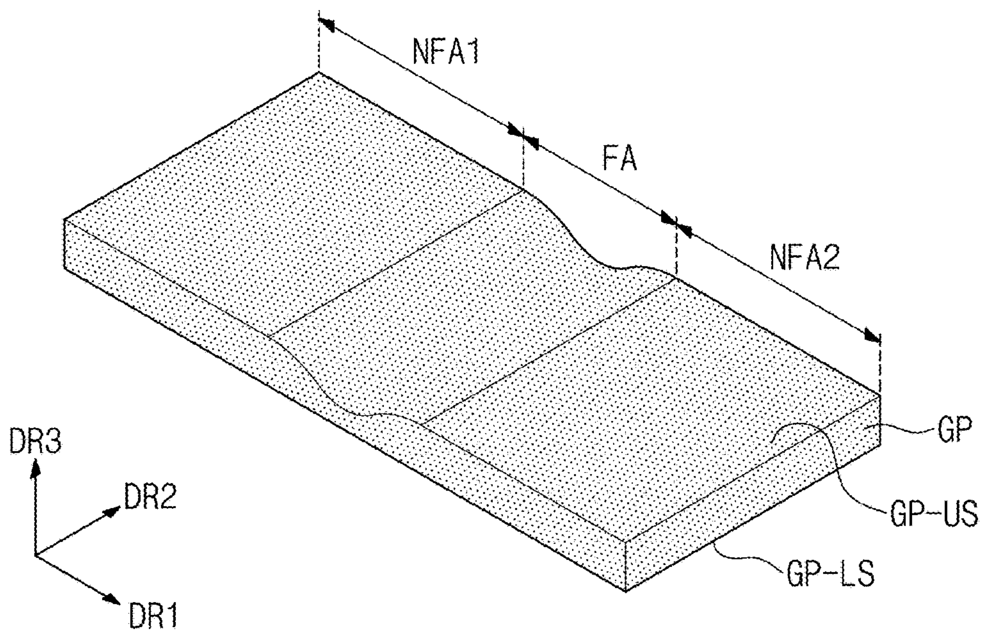

Referring to FIGS. 6 and 7A, a glass substrate GP is provided in an operation S1 of providing the glass substrate GP. The glass substrate GP may have been subjected to a slimming operation. That is, the glass substrate GP may be formed by slimming a region, corresponding to a folding region FA, of the predetermined glass substrate GP having a flat shape throughout a first non-folding region NFA1, the folding region FA, and a second non-folding region NFA2 such that the region has a smaller thickness than the periphery thereof. Accordingly, a first flat portion FLP1, a second flat portion FLP2, and a recessed portion RP may be formed.

The glass substrate GP may include an upper surface GP-US, a lower surface GP-LS, and a plurality of side surfaces GP-SS, and an upper surface of the recessed portion RP may be formed to have a shape depressed from upper surfaces of the non-folding regions NFA1 and NFA2 through slimming. In this embodiment, the upper surface of the recessed portion RP may be slimmed down into a curved shape, but the inventive concept is not limited thereto. The upper surface of the recessed portion may be slimmed down into a flat shape while being depressed from the upper surfaces of the non-folding regions NFA1 and NFA2, and the inventive concept is not limited to a particular embodiment.

Figure 8A:
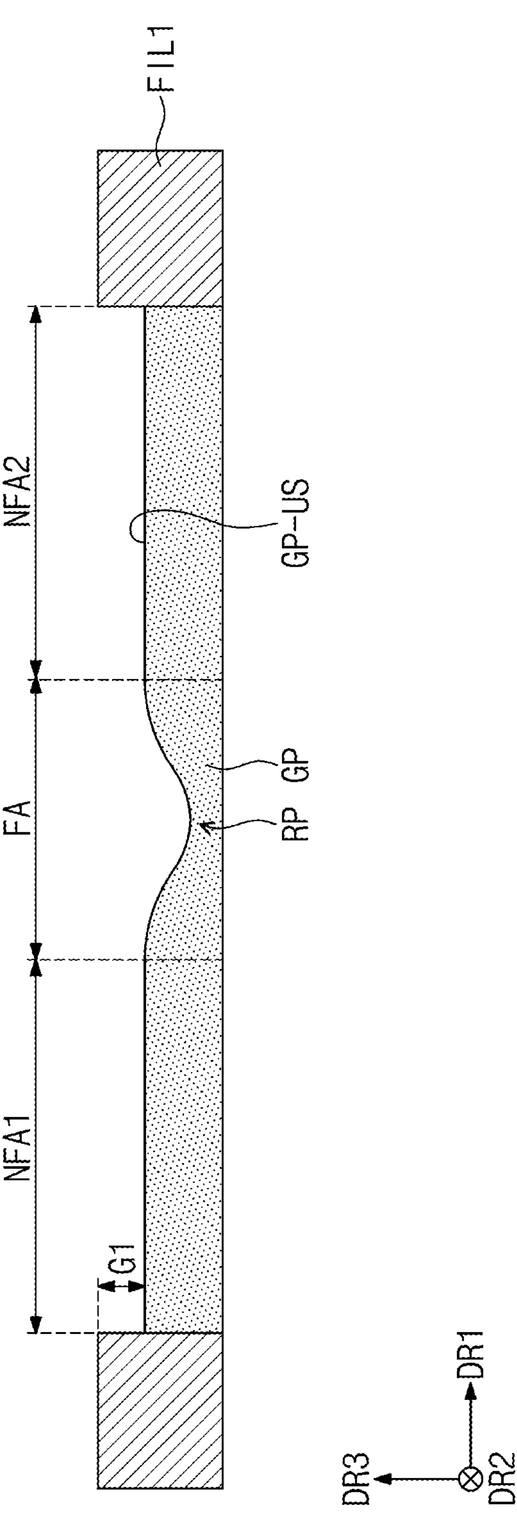
FIGS. 8A and 8B are respectively a cross-sectional view and a perspective view illustrating an embodiment of a part of operations of a method for manufacturing a window according to the inventive concept.
Figure 8B:
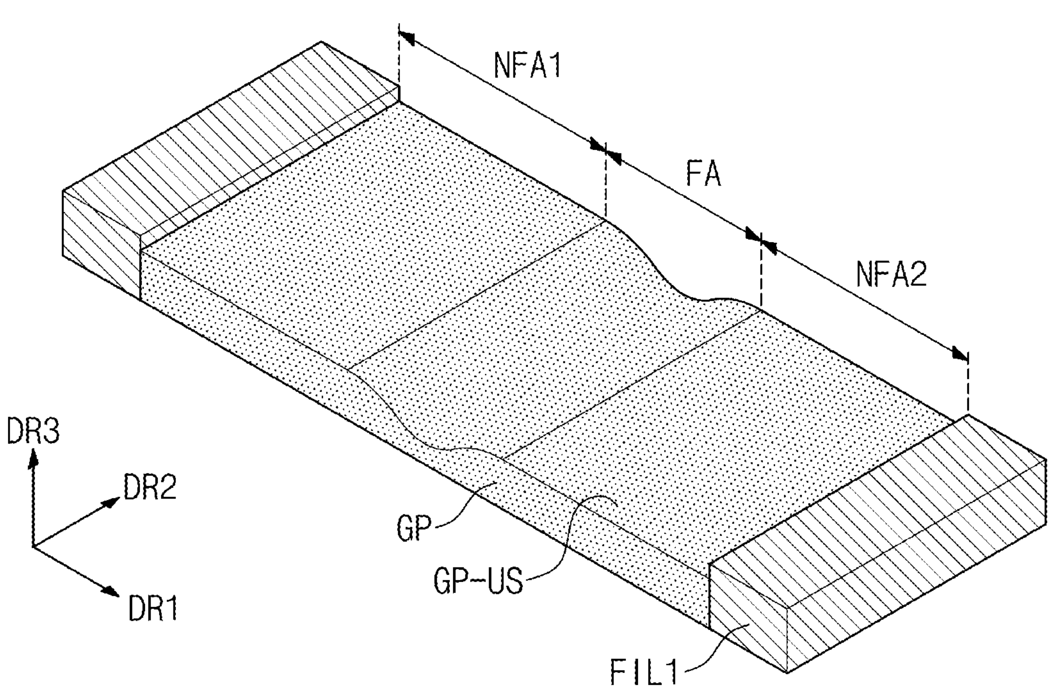

Referring to FIGS. 6, 8A, and 8B, afterwards, an operation S2 of disposing a guide film may be performed. In the operation S2 of disposing the guide film (or a first film FIL1), the first film FIL1 may be disposed so as to include a surface facing the side surfaces GP-SS (refer to FIG. 3C) of the glass substrate GP. The first film FIL1 may be provided in plural. In FIGS. 8A and 8B, it is illustrated that the first film FIL1 is disposed only on the two side surfaces GP-SS1 and GP-SS2 (refer to FIG. 3C) of the glass substrate GP, but the inventive concept is not limited thereto. The first film FIL1 may be disposed on all the side surfaces GP-SS (refer to FIG. 3C) of the glass substrate GP.

An upper surface FIL1-US (refer to FIG. 9A) of the first film FIL1 may be formed to protrude by a first distance G1 from the upper surface GP-US of the glass substrate GP. That is, a thickness of the first film FIL1 may be greater than a maximum thickness of the glass substrate GP. Accordingly, a space to be filled with a resin RS (refer to FIG. 10B or 10C) may be secured.

In FIGS. 8A and 8B, it is illustrated that the first film FIL1 is in direct contact with the side surface GP-SS (refer to FIG. 3C) of the glass substrate GP, but the first film FIL1 may be spaced apart from the side surface GP-SS (refer to FIG. 3C) of the glass substrate GP such that a predetermined space is formed. In an embodiment, the first film FIL1 may be spaced apart from the side surface GP-SS (refer to FIG. 3C) of the glass substrate GP by a second distance (not illustrated), for example. Since a predetermined space between the first film FIL1 and the side surface GP-SS (refer to FIG. 3C) of the glass substrate GP is formed, a space to be filled with the resin RS (refer to FIG. 10B or 10C) that may cover the side surface GP-SS (refer to FIG. 3C) of the glass substrate GP may be secured. However, the inventive concept is not limited thereto, and the first film FIL1 may be in direct contact with the side surface GP-SS (refer to FIG. 3C) of the glass substrate GP.

Figure 9A:
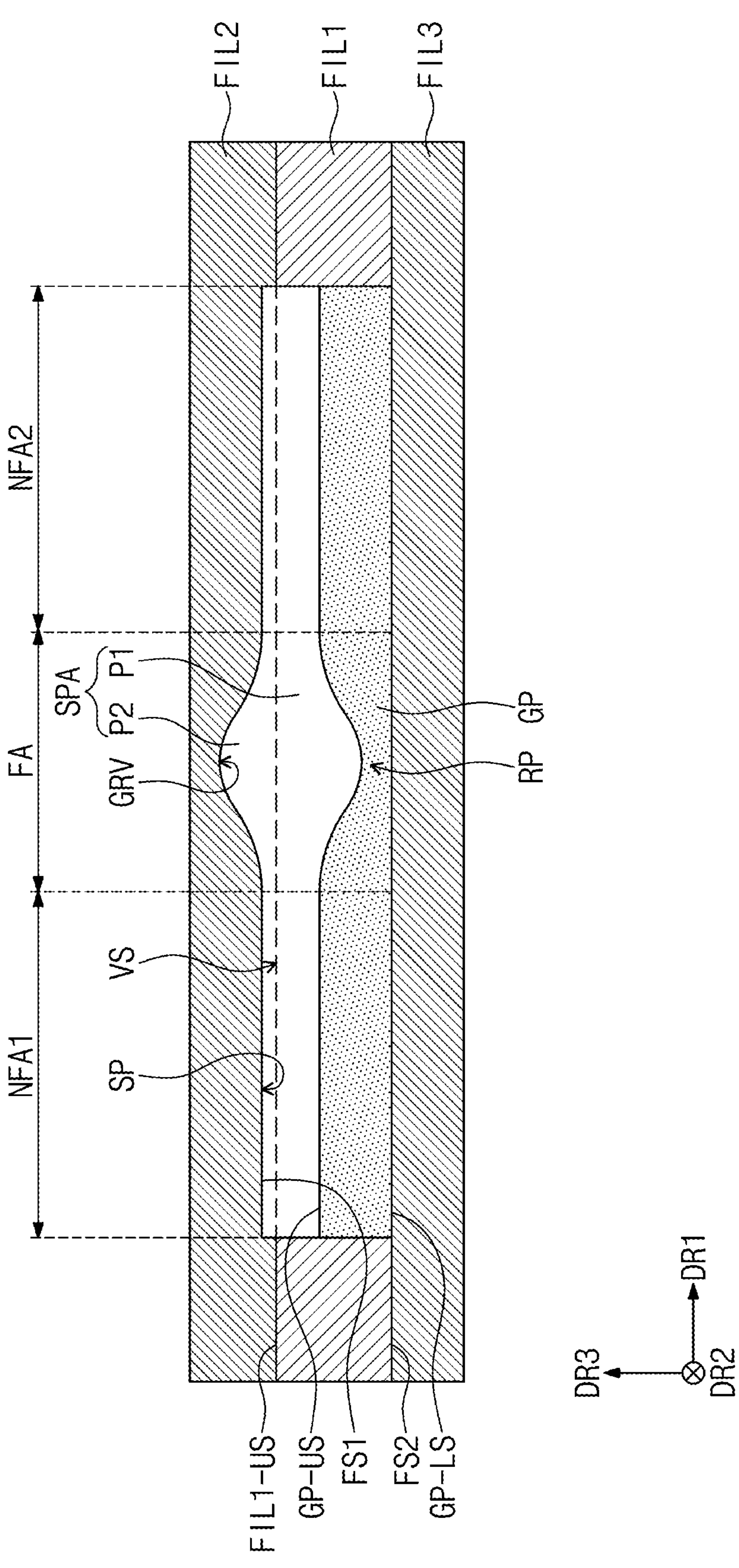
FIGS. 9A and 9B are respectively a cross-sectional view and a perspective view illustrating an embodiment of a part of operations of a method for manufacturing a window according to the inventive concept.
Figure 9B:
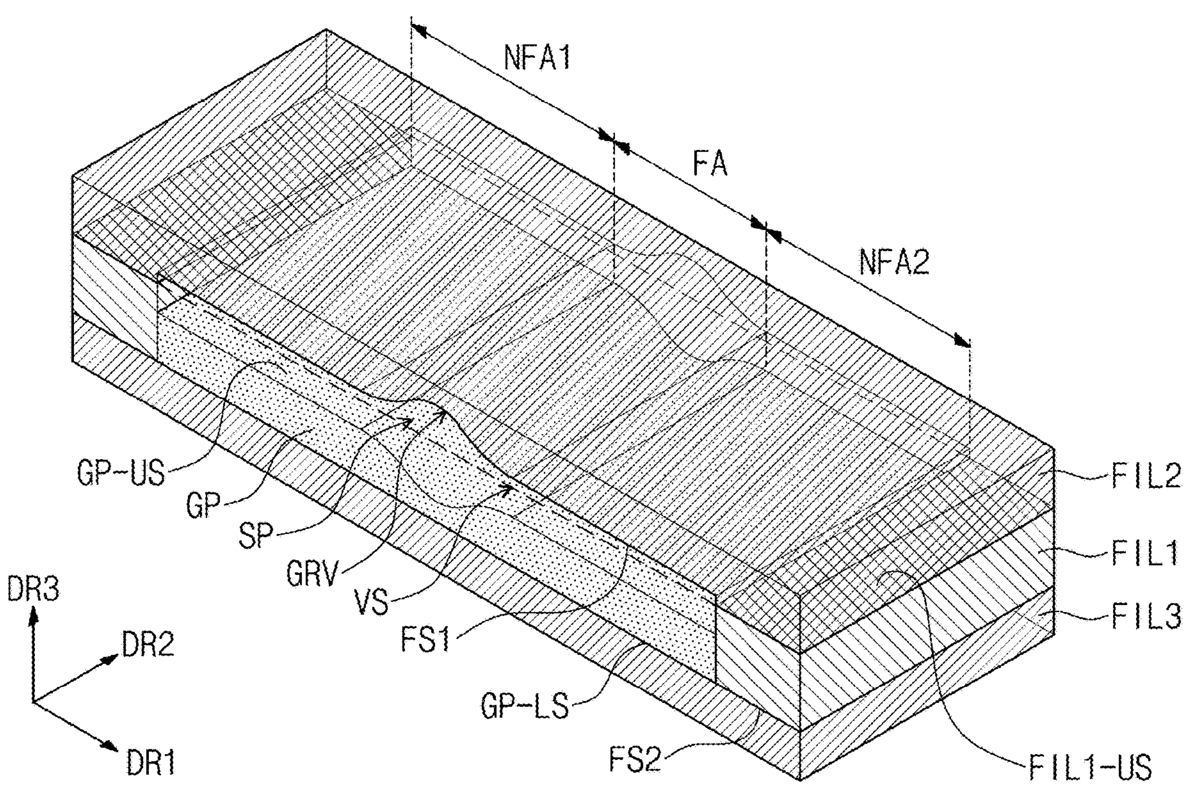

Referring to FIGS. 6, 9A, and 9B, afterwards, an operation S3 (refer to FIG. 6) of disposing a support film may be performed. The support film may include a second film FIL2 and a third film FIL3. The second film FIL2 may be disposed on the upper surface GP-US of the glass substrate GP to be spaced apart from the upper surface GP-US with a predetermined space SPA therebetween. The space SPA may include a first space P1 defined between the upper surface GP-US of the glass substrate GP and a virtual plane VS (hereinafter, also referred to as a reference surface) extending from the upper surface FIL1-US of the first film FIL1 to overlap the glass substrate GP, and a second space P2 defined between the reference surface VS and the first film FIL1.

The second film FIL2 may include a first surface FS1 in which a groove portion GRV facing the recessed portion RP defined in the upper surface GP-US of the glass substrate GP is defined. The third film FIL3 may include a second surface FS2 facing the lower surface GP-LS of the glass substrate GP. The second film FIL2 and the third film FIL3 may be provided such that the first film FIL1 is disposed between the first surface FS1 and the second surface FS2.

Referring to FIGS. 9A and 9B, the first surface FS1 of the second film FIL2 may be provided so as to further include stepped portions SP spaced apart from each other with the groove portion GRV therebetween. That is, the first surface FS1 may be provided so as to include both a flat portion and a groove portion. A spaced distance (hereinafter, a first depth) between the flat portion and the reference surface VS may be different from a maximum spaced distance (hereinafter, a second depth) between the groove portion and the reference surface VS. The first depth and the second depth may be set in consideration of a curing shrinkage rate of the resin RS. An upper surface of the window WM to be described later may be flat by controlling the first depth and the second depth. In an embodiment, when the first depth is about 1 μm, the second depth may be about 5 μm, for example.

The first depth may also be 0 μm. Here, in the second film FIL2, the stepped portions SP may be omitted and only the groove portion GRV may be provided. In an embodiment, the first depth may be 0 μm, and the second depth may be about 4 μm, for example. However, this is indicated, and the second depth may be provided as various values as long as the curing shrinkage rate of the resin RS may be compensated. The inventive concept is not limited to a particular embodiment.

Referring to FIG. 6 and FIGS. 10A to 10C, afterwards, an operation S4 of filling with the resin RS may be performed. The resin RS may be filled into the space SPA defined between the glass substrate GP and the first to third films FIL1, FIL2, and FIL3. The resin RS may be filled while being in contact with the groove portion GRV of the first surface FS1. That is, a protruding portion facing the groove portion GRV of the first surface FS1 may be formed on the resin RS.

Figure 10A:
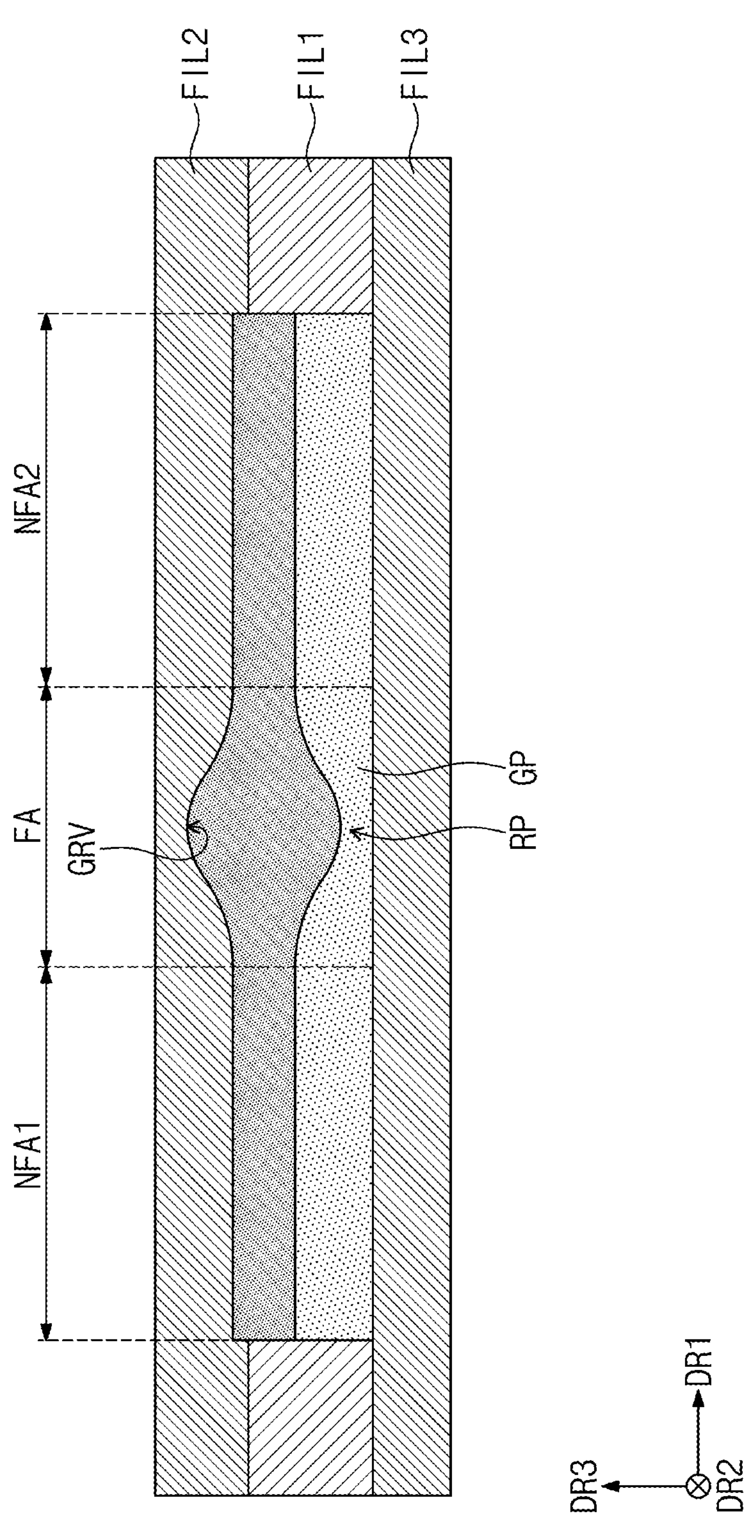
Figure 10B:
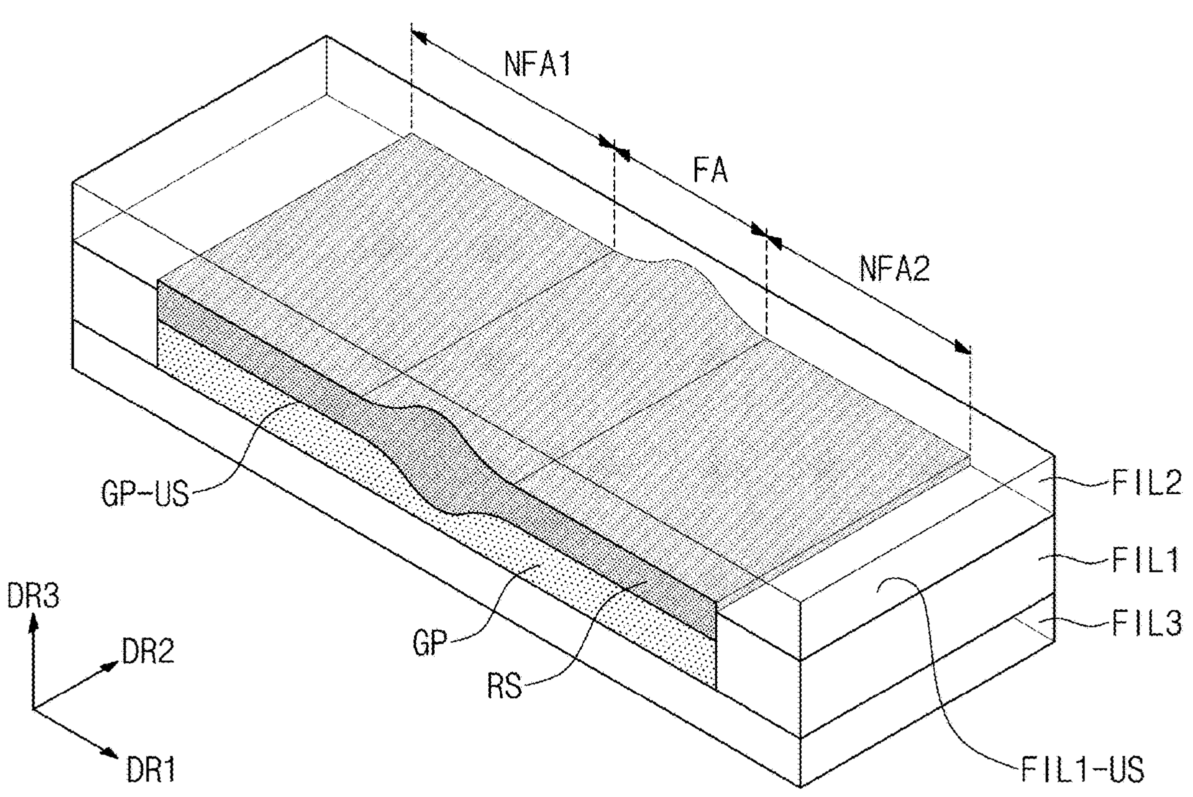

FIGS. 10A and 10B illustrate that the first film FIL1 is in direct contact with the side surface GP-SS (refer to FIG. 3C) of the glass substrate GP, but the first film FIL1 may be spaced apart from the side surface GP-SS (refer to FIG. 3C) of the glass substrate GP. Accordingly, a space (not illustrated) between the first film FIL1 and the side surface GP-SS (refer to FIG. 3C) of the glass substrate GP may be filled with the resin RS. Since the resin RS is filled into the corresponding space (not illustrated), the side surface GP-SS (refer to FIG. 3C) of the glass substrate GP may be covered by the resin RS. The side surface GP-SS (refer to FIG. 3C) of the glass substrate GP may be strengthened by the resin RS, thereby improving the impact resistance of the window WM.

Figure 10C:
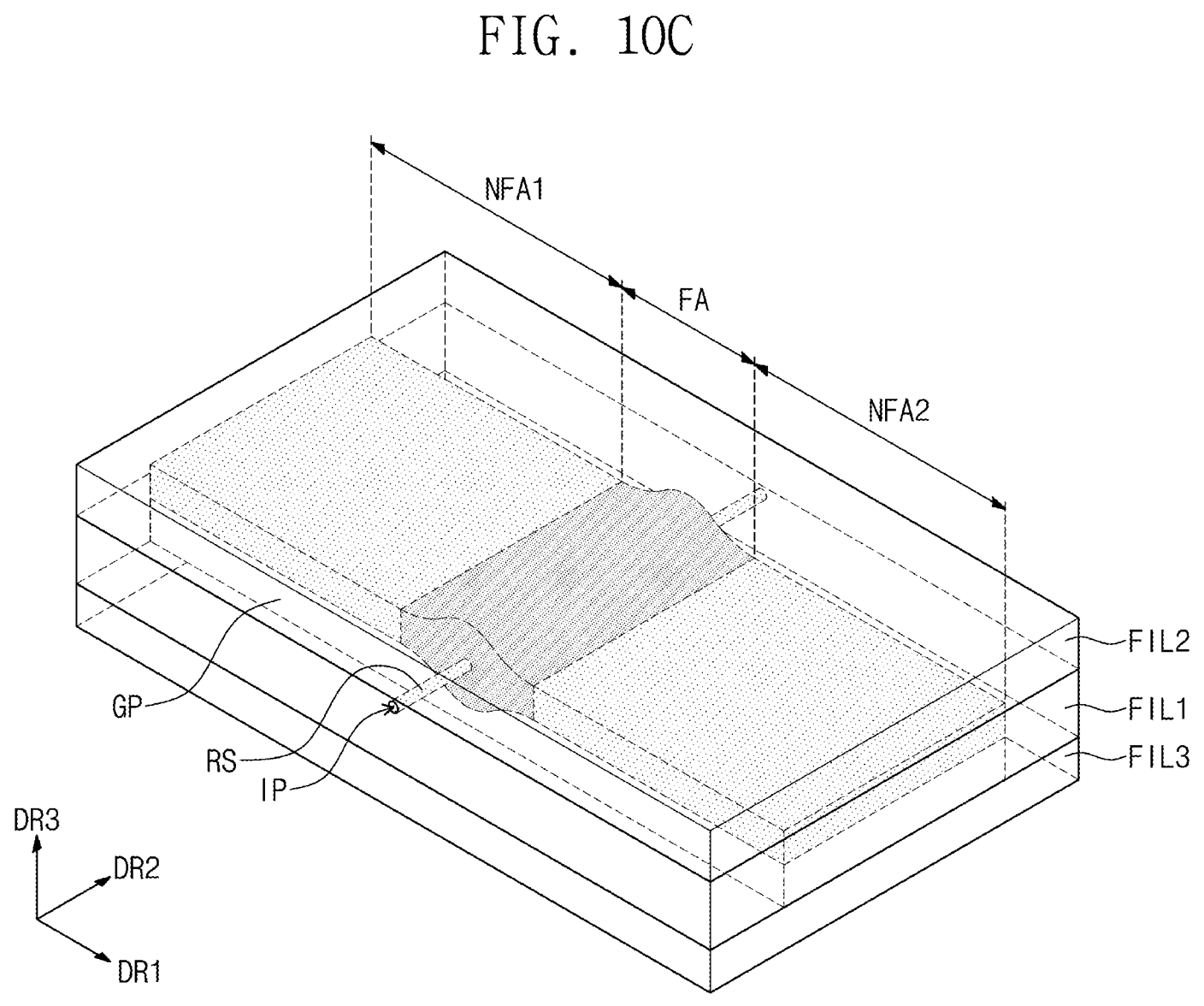

The resin RS may be filled by the principle of capillary phenomenon. Referring to FIG. 10C, an injection part IP into which the resin RS is injected may be relatively narrower than the space filled with the resin RS, and therefore the resin RS injected into the injection part IP may be uniformly filled into the inside of the space SPA (refer to FIG. 9A) through the capillary phenomenon. FIG. 10C illustrates that a cross section of the injection part IP has a quadrangular shape, but the inventive concept is not limited thereto. The injection part IP may be provided in various shapes.

Here, the space SPA (refer to FIGS. 9A and 9B) defined between the glass substrate GP and the first to third films FIL1, FIL2, and FIL3 may be filled through a one-time injection of the resin RS. Accordingly, one-time application of the resin makes it possible to reduce the step difference between the folding region FA and the non-folding regions NFA1 and NFA2 of the glass substrate GP, compared to multiple-time application of the resin RS. That is, a protruding portion may not be formed at a boundary portion between the folding region FA and the non-folding regions NFA1 and NFA2 of the glass substrate GP, compared to the case where the resin RS is applied through a different process. Accordingly, the application uniformity of the resin RS may be improved, and thus the display panel DP with improved visibility may be provided.

Figure 11A:
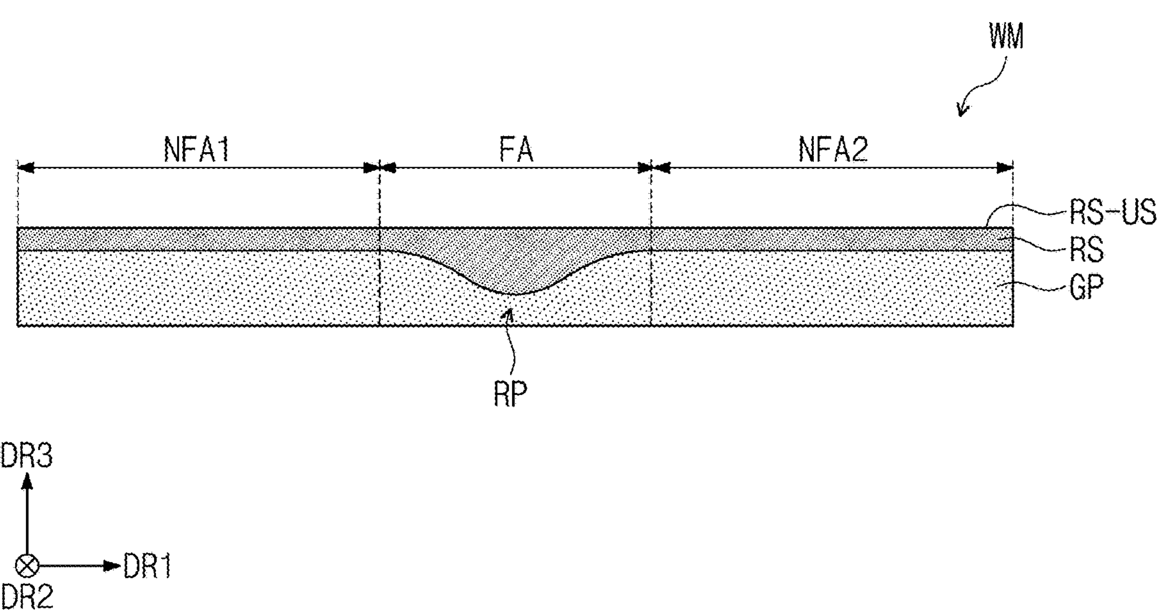
FIGS. 11A and 11B are respectively a cross-sectional view and a perspective view illustrating an embodiment of a part of operations of a method for manufacturing a window according to the inventive concept.
Figure 11B:
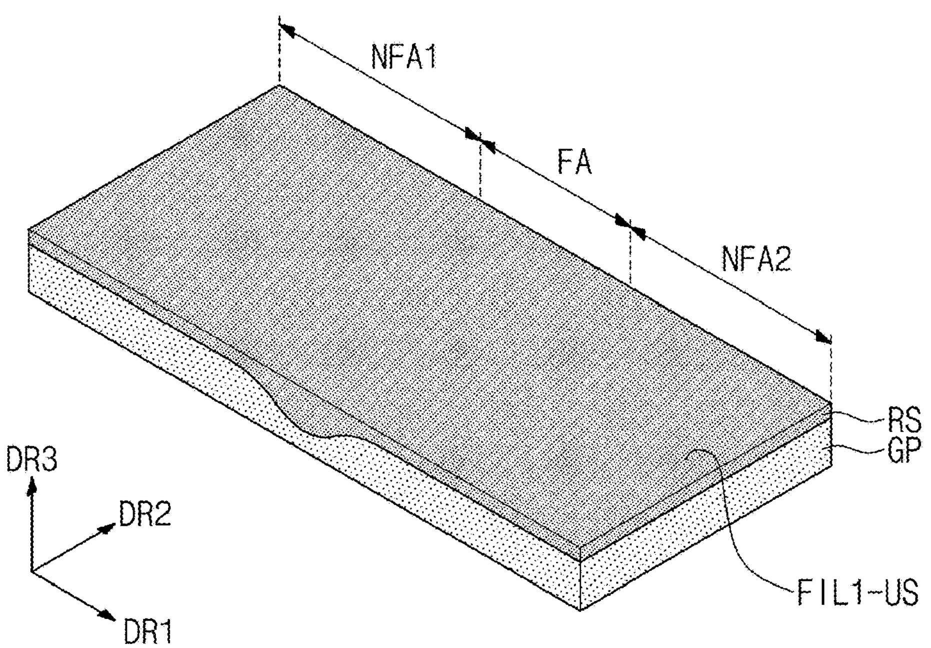

Referring to FIGS. 6, 11A and 11B, afterwards, an operation S5 (refer to FIG. 6) of curing the resin RS may be performed. The resin RS may be spaced apart from the groove portion GRV (refer to FIG. 10A) by performing ultraviolet ("UV") curing. That is, the resin RS may be spaced apart from the groove portion GRV (refer to FIG. 10A) of the first surface FS1. In the operation S3 (refer to FIG. 6) of disposing the support film (or the second film FIL2 and the third film FIL3), the groove portion GRV (refer to FIG. 10A) may be formed in the first surface FS1 of the second film FIL2 in consideration of the curing shrinkage rate, and thus an upper surface RS-US of the resin RS may become flat after performing the UV curing.

According to the inventive concept, a film including a groove shape is provided on an upper surface of a glass substrate to be spaced apart from the upper surface by a predetermined space, and then a resin may be filled into the corresponding space and cured, thereby improving the flatness of the upper surface of the glass substrate. Accordingly, a window with improved impact resistance and reduced defective exterior may be provided.

In the above, description has been made with reference to embodiments, but those skilled in the art or those of ordinary skill in the relevant technical field may understand that various modifications and changes may be made to the inventive concept within the scope not departing from the spirit and the technology scope of the inventive concept described in the claims to be described later. Therefore, the technical scope of the inventive concept is not limited to the contents described in the detailed description of the specification, but should be determined by the claims.

What is claimed is:

1. A window comprising:

a glass substrate including:

a first flat portion having a first thickness;

a second flat portion spaced apart from the first flat portion in a first direction and having the first thickness; and a recessed portion disposed between the first flat portion and the second flat portion and having a second thickness smaller than the first thickness; and a first resin which covers at least one among side surfaces of the glass substrate; and a second resin which covers an upper surface of the glass substrate, wherein a width of the recessed portion is smaller than a width of each of the first flat portion and the second flat portion, and the width of each of the recessed portion, the first flat portion, and the second flat portion is defined in a second direction crossing the first direction, wherein the recessed portion includes portions having different widths from each other in the second direction when viewed in a plan view.

2. The window of claim 1, wherein a folding axis extending along the second direction and overlapping the recessed portion is defined, and the recessed portion is folded along the folding axis.

3. The window of claim 1, wherein a side surface of the recessed portion is curved.

4. The window of claim 1, wherein the first resin has a width which is constant in the second direction.

5. The window of claim 1, wherein a surface, of the first resin, which contacts the glass substrate is flat.

6. The window of claim 1, wherein the first resin covers a side surface of the recessed portion and exposes a plurality of side surfaces of the first and second flat portions.

7. The window of claim 6, wherein the first resin comprises a surface aligned with the plurality of side surfaces of the first and second flat portions.

8. The window of claim 1, wherein the second resin comprises a lower surface facing the glass substrate and an upper surface opposed to the lower surface, and the upper surface of the second resin is flat.

9. An electronic apparatus comprising:

a window module comprising:

a glass substrate including:

an upper surface including an upper surface of a recessed portion;

a lower surface opposed to the upper surface; and a plurality of side surfaces connecting the upper surface and the lower surface;

a first film including a surface facing the plurality of side surfaces of the glass substrate;

a second film spaced apart from the upper surface so that a space is defined between the second film and the upper surface, the second film including:

a first surface in which a groove portion facing the recessed portion of the upper surface is defined;

a third film including a second surface facing the lower surface of the glass substrate; and a resin filled into the space, wherein the resin contacts the recessed portion of the upper surface and a portion of the first surface defining the groove portion, and the first film is disposed between the first surface and the second surface.

10. The electronic apparatus of claim 9, wherein the first surface further comprises a plurality of stepped portions spaced apart from each other with the groove portion between stepped portions immediately next to each other among the plurality of stepped portions.

11. The electronic apparatus of claim 10, wherein a virtual plane extending from an upper surface of the first film to overlap the glass substrate is defined, and a maximum spaced distance between the plurality of stepped portions and the virtual plane and a maximum spaced distance between the groove portion and the virtual plane are different.

12. The electronic apparatus of claim 9, wherein the resin contacts the groove portion of the first surface.

13. The electronic apparatus of claim 9, wherein the resin has a flat upper surface which is not in contact with the first surface.

14. The electronic apparatus of claim 9, wherein the first film is spaced apart from the plurality of side surfaces of the glass substrate and contacts the resin.

15. The electronic apparatus of claim 9, wherein the first film is in direct contact with the plurality of side surfaces of the glass substrate.

16. The electronic apparatus of claim 9, wherein a thickness of the first film is greater than a maximum thickness of the glass substrate.

17. A method for manufacturing a window, the method comprising:

providing a glass substrate which includes an upper surface including an upper surface of a recessed portion, a lower surface opposed to the upper surface, and a plurality of side surfaces connecting the upper surface and the lower surface;

disposing a first film which includes a surface facing the plurality of side surfaces of the glass substrate;

disposing a second film which is spaced apart from the upper surface so that a predetermined space is defined between the second film and the upper surface, the second film including:

a first surface in which a groove portion facing the recessed portion of the upper surface is defined, disposing a third film which includes a second surface facing the lower surface of the glass substrate so that the first film is disposed between the first surface and the second surface;

filling, with a resin, a space defined between the glass substrate and the first to third films such that the resin contacts a portion of the first surface defining the groove portion and the recessed portion of the upper surface of the glass substrate; and curing the resin, wherein the resin is filled by a capillary phenomenon.

18. The method of claim 17, wherein in the filling with the resin, the resin is filled while being in contact with the groove portion.

19. The method of claim 17, wherein in the curing the resin, the resin is spaced apart from the groove portion.

20. The method of claim 17, wherein in the disposing the first film, the first film is spaced apart from the side surfaces of the glass substrate to define a space.

* * * * *